March 3, 1959 R. D. TORREY 2,876,439

BINARY COUNTER

Filed March 29, 1955

INVENTOR

ROBERT D. TORREY

BY Charles C. English

AGENT

United States Patent Office 2,876,439
Patented Mar. 3, 1959

2,876,439

BINARY COUNTER

Robert D. Torrey, Philadelphia, Pa., assignor, by mesne assignments, to Sperry Rand Corporation, a corporation of Delaware Application March 29, 1955, Serial No. 497,720

5 Claims. (Cl. 340—174)

The present invention relates to bistable devices and is more particularly concerned with a binary counter capable of being utilized in performing binary digital computation or other logical functions. In particular, the present invention is concerned with binary counters which may be utilized alone or as a portion of more complex electronic devices such as ring counters, shifting registers, etc.

As is well known, one of the basic components of computing systems is the binary counter device. Such devices have in the past normally been constructed of vacuum tube components, and while these are ordinarily quite reliable, they present a number of disadvantages. Thus, such prior devices have been subject to normal operating failures and further have been relatively fragile in construction, thereby presenting serious problems of maintenance and the cost attendant thereto. To obviate certain of the foregoing disadvantages, other types of devices have been suggested for use in computing applications, and for use as binary counters in such applications. One such other device is the magnetic amplifier, and it is with this particular type of construction that the present invention is primarily concerned.

It is accordingly an object of the present invention to provide a novel bistable device.

A further object of the present invention resides in the provision of a bistable device capable of acting as a binary counter.

A still further object of the present invention resides in the provision of a binary counter which is more rugged in configuration and which is less expensive to construct than prior art counters.

Still another object of the present invention resides in the provision of a novel binary counter employing magnetic amplifiers.

Still another object of the present invention is the provision of a binary counter comprising a plurality of delay devices cooperating with a plurality of gating devices, and interconnected to provide a single output pulse for each pair of input pulses coupled thereto.

In providing a binary counter, in accordance with the present invention, a bistable device is utilized which may, if desired, employ a magnetic amplifier as one portion thereof. The bistable device is in turn interconnected with a pluarlity of gates, one such gate being interposed between the output of the said bistable device and a utilization circuit; the said utilization circuit may, if desired, comprise further binary counter stages, in accordance with the present invention. The state of conductivity of the said gate is in turn controlled by the condition of the bistable device employed, and delay means are preferably utilized to impose a time lag between the changing of the said bistable device from one of its stable states to the other, and the corresponding change in the state of conductivity of the said gate. By utilizing such an arrangement, the gate is permitted to pass an initial output appearing from the said bistable device when it is in a predetermined one of its stable states, and is then prevented from passing further outputs so long as the bistable state remains in the said predetermined stable state.

The binary counter, in accordance with the present invention, further utilizes an input circuit for selectively causing the said bistable device to be changed from one of its stable states to the other thereof. By this arrangement, therefore, the bistable device is permitted to pass an initial output through the said gate only when it is in a predetermined stable state; passes no output through the said gate when it is in the other of its stable states, and is selectively changed from one to the other of the said stable states by input pulses to be counted, whereby but a single output pulse appears via the said gate for each pair of input pulses applied to the counted circuit.

In a preferred embodiment of the present invention, the bistable device utilizes magnetic amplifier devices, but it should be noted that, in accordance with the broader aspects of the present invention, other forms and configurations of bistable devices may be employed utilizing, in particular, other forms of amplifiers. In addition, as will become apparent from the following discussion, when magnetic amplifiers are employed, one such amplifier may comprise a non-complementing magnetic amplifier, and in this respect such a non-complementing magnetic amplifier is defined as one which produces an output pulse only in response to an input pulse applied thereto. The operation of pulse type non-complementing magnetic amplifiers is closely analogous to that of passive delay means, and, in accordance with a further concept of the present invention, such delay means may be substituted for the magnetic amplifier or amplifiers employed, whereby a binary counter comprising delay elements and gating means only is achieved.

The foregoing objects, advantages, construction and operation of the present invention will become more readily apparent from the following description and accompanying drawings, in which.

Figure 1:
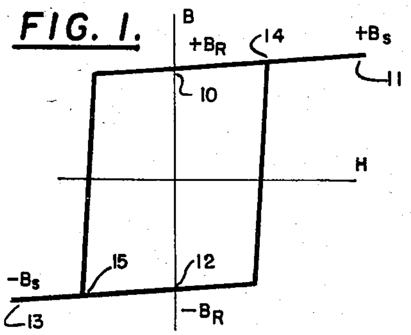
Figure 1 is an idealized hysteresis loop of a magnetic material which may be employed in the cores of magnetic amplifiers utilized in the practice of one form of the present invention.

Referring now to Figure 1, it will be seen that magnetic amplifiers such as may be utilized in the present invention preferably, but not necessarily, employ magnetic cores exhibiting a substantially rectangular hysteresis loop. Such cores may be made of a variety of materials among which are the various types of ferrites and various kinds of magnetic tapes, including Orthonik and 4–79 Molypermalloy. These materials may be given different heat treatments to effect different desired properties. In addition to the wide variety of materials applicable, the cores of such magnetic amplifiers may be constructed in a number of different geometries including both closed and open paths. For example, cup-shaped cores, strips of material, or toroidal cores are possible. It must be emphasized, however, that the present invention is not limited to any specific geometries of the core nor to any specific materials therefor, and the examples to be given are illustrative only. Neither the precise core configuration nor the precise hysteretic character of the core material is mandatory and many variations will readily suggest themselves to those skilled in the art.

Returning now to the hysteresis loop shown in Figure 1, it will be noted that the curve exhibits several significant points of operation; namely, point 10 (+B*r*) which represents a point of plus remanence; the point 11 (+B*s*) which represents plus saturation; the point 12 (−B*r*) which represents minus remanence; the point 13 (−B*s*) which represents minus saturation; and the points 14 and 15 which represent respectively the beginnings of the plus saturation region and of the minus saturation region.

Discussing for the moment the operation of the device utilizing a core which exhibits a hysteresis loop such as is shown in Figure 1, let us assume that a coil is wound on the said core. If we should initially assume that the core is at the operating point 10 (plus remanence), and if a voltage should be applied to the said coil passing a current through the said coil in a +H magnetizing direction, that is in a direction tending to increase the flux in the said core, the core will tend to be driven from point 10 (+B*r*) to point 11 (+B*s*). During this state of operation there is relatively little flux change in the core and the coil therefore presents a relatively low impedance whereby energy fed to the said coil during this state of operation will pass readily therethrough and may be utilized to effect a usable output.

On the other hand, if the core should initially be at the point 12 (−B*r*) prior to the application of a +H input pulse, upon application of such a pulse the core will tend to be driven in a counter-clockwise direction around the hysteresis loop from the said point 12 (−B*r*) to the region of point 11 (plus saturation). The input pulse is preferably so chosen that the core is actually driven only to approximately point 14, that is to the beginning of the plus saturation region, rather than to point 11 which represents full saturation. During this latter state of operation, there is a relatively large flux change in the core and the coil therefore exhibits a relatively high impedance to the applied pulse. As a result, substantially all of the energy applied to the coil, when the core is initially at −B*r*, will be expended in flipping the core from point 12 to point 14, and thence to +B*r* point 10, with very little of this energy actually passing through the said coil to give a usable output. Thus, depending upon whether the core is initially at point 10 (+B*r*) or at point 12 (−B*r*), an applied +H pulse will be presented respectively with either a low impedance or a high impedance and will effect either a relatively large output or a relatively small output. These considerations are of great value in the construction of magnetic amplifiers such as may be utilized in the present invention.

Figure 2:
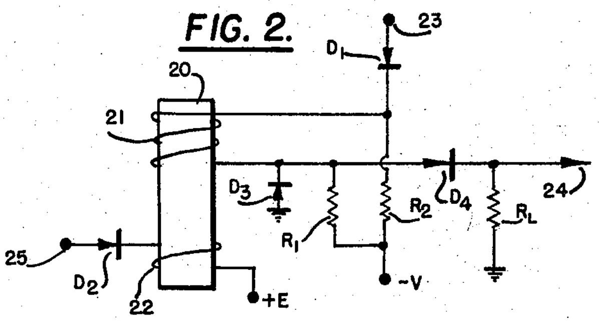
Figure 2 is a schematic diagram of a non-complementing magnetic amplifier, such as may be employed in the present invention.
Figure 3:
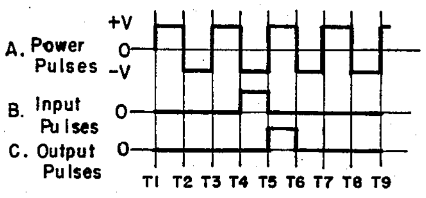
Figure 3 (A through C) are waveforms illustrating the operation of the circuit shown in Figure 2.

Referring now to Figure 2, and making reference to the waveform diagrams of Figure 3 (A through C), it will be seen that a non-complementing magnetic amplifier in accordance with the present invention utilizes a magnetic core 20 preferably but not necessarily exhibiting a hysteresis loop substantially the same as that shown in Figure 1. The core 20 carries two windings thereon, namely, a power or output winding 21 and a signal or input winding 22. One end of the power winding 21 is coupled by a rectifier D1, poled as shown, to a source 23 of positive and negative-going power pulses such as are illustrated in Figure 3A. For purposes of the following discussion, the power pulses are assumed to have a center value of "0" volts and to exhibit excursions between plus and minus V volts. Assuming now that the device is initially at the −B*r* point 12 of Figure 1, application of a positive-going power pulse, for instance during the time interval T1 to T2, at power input terminal 23, will cause a current to flow through the rectifier D1 to winding 21 and thence through rectifier D4 and resistor $R_L$ to ground. Inasmuch as this energy is for the most part expended in flipping the core from −B*r* (point 12 of Figure 1) to +B*r* (point 10 of Figure 1), only a very small output at best will appear across the load resistor $R_L$. This small output is termed a sneak output and is effectively suppressed by the combination of resistor R1 and rectifier D3, connected as shown. This suppression is effected by so choosing the magnitude of resistor R1 that a current normally flows from ground through the said rectifier D3 and the resistor R1 to the source of negative potential −V, which current is equal to or greater than that of the sneak pulse current to be suppressed. Because of the operation of rectifier D3 and resistor R1, therefore, only outputs substantially larger than that of the sneak output may appear at output terminal 24.

Summarizing the foregoing, therefore, during the time T1 to T2, the applied positive-going power pulse merely succeeds in flipping the core from −B*r* to +B*r*, and due to the suppression of diode D3 and resistor R1, no output will appear at terminal 24. During the period T2 to T3 for instance, a negative-going power pulse is applied at terminal 23 and this applied pulse effectively causes rectifier D1 to cut off. During this period of time, a reverse current flows from ground through rectifier D3 through winding 21 and thence through resistor R2 to the source of negative potential −V. The value of this current flow in the said reverse direction through coil 21 is sufficient to flip the core 20, during the period T2 to T3 for instance, from +B*r* (point 10 of Figure 1) in a counter-clockwise direction to point 15 and thence to operating point 12 (−B*r*). At time T3, therefore, the core 20 once more finds itself at its −B*r* operating point and a further positive-going power pulse applied at terminal 23 during the time T3 to T4 will again merely flip the core to the region of +B*r* without effecting any output. Thus, in the absence of any other input signals, the core is regularly flipped between −B*r* and +B*r* and thence back to −B*r*, without there being any output.

If we should now further assume that an input pulse, as shown in Figure 3B, is applied to input terminal 25, during the time period T4 to T5, for instance, this input pulse will effect a current flow through the winding 22 and will subject the core 20 to a magnetizing force in opposition to that produced by the reverse current flow through winding 21 during this same time period. This opposing magnetizing force results, as will become apparent from an examination of the winding directions shown in Figure 2, inasmuch as the coil 22 is wound in the same direction as coil 21 on the said core 20. The magnetizing effect of the said reverse current flow through winding 21 is thus effectively nullified, and therefore at the end of the T4 to T5 time period, the core remains at its +B*r* operating point 10 and application of a further positive-going power pulse, during the time T5 to T6 for instance, will drive the core to positive saturation causing a substantial output to appear across load resistor $R_L$ and at output terminal 24. If no further input pulse should be applied during the time T6 to T7, the reverse current flow through winding 21 will again cause the core to flip back to its −B*r* point 12. No output will therefore appear during the time interval T7 to T8, etc. Thus, the arrangement shown in Figure 2 permits an output to appear across resistor $R_L$ during the application of a positive-going power pulse only if an input had been applied at the terminal 25 during the next preceding negative-going power pulse.

One other design consideration should be noted. Current flow through the winding 21, in the absence of other circumstances, establishes flux changes tending to induce voltages in the signal or input coil 22. In order to protect the input circuit connected to rectifier D2 from any interference due to current flowing in the power winding 21, the signal winding 22 is returned to a positive voltage +E, as shown, which positive voltage is equal and opposite in value to the voltage induced or generated in the said winding 22 when the said reverse current flows in the power winding 21.

The non-complementing amplifier shown in Figure 2, or other forms of amplifiers having analogous operating characteristics, may readily be utilized to form bistable devices, and such bistable devices may in turn be interconnected with other circuit elements to perform the binary counting functions of the present invention. Thus, referring to Figure 4, it will be seen that, in accordance with the present invention, a binary counter may utilize a bistable device which bistable device in turn comprises a non-complementing amplifier 40, first delay means 41 and an inhibition type gate 42 connected in a closed loop via a buffer 43. As will be appreciated from the foregoing discussion, if an input pulse should be applied to amplifier 40, for instance via the buffer 43, the amplifier 40 will produce an output pulse which is coupled via delay means 41, gate 42 and buffer 43 back to the input of non-complementing amplifier 40 acting as a further input pulse thereto. The application of an input pulse via buffer 43 thus causes the bistable device described to assume a first stable state, characterized by a recirculating condition. If a further input pulse should thereafter be applied to the inhibition terminal 44 of the gate 42, for instance, the recirculation path will be broken thereby preventing the passage of recirculating inputs back to the input of amplifier 40 and causing the bistable device to revert to a second stable state characterized by a lack of recirculation.

Such a bistable device may be modified, in accordance with the present invention, to effect a binary counter. Thus, referring to Figure 4, an inhibition type output gate 45 may have an input terminal thereof coupled to the output of amplifier 40. Pulses selectively appearing in the bistable recirculation path, and particularly at the output of delay means 41, may be coupled via further delay means 46 to an inhibition terminal of the said output gate 45 thereby to selectively control the state of conductivity of gate 45. An input circuit is further utilized and may comprise a source of input pulses 47, coupled via an inhibition type input gate 48 to the buffer 43 and also coupled to the inhibition control terminal 44 of recirculation gate 42. The state of conductivity of the input gate 48 is further controlled by the recirculation state of the bistable device and therefore, in accordance with one form of the present invention, the pulses appearing at the output of delay means 41 may be coupled, as shown, to an inhibition terminal of the said input gate 48. Pulse outputs, comprising a single pulse for each pair of input pulses appearing from source 47, will appear at the terminal 49 of output gate 45.

Figure 4:
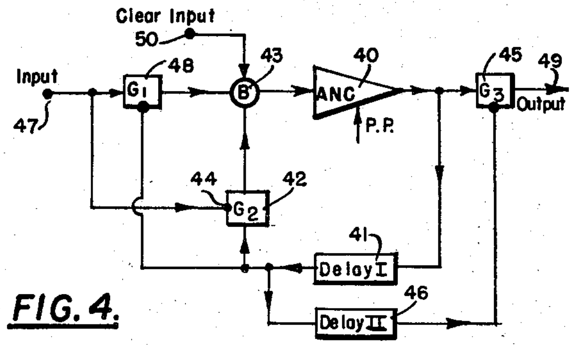
Figure 4 is a logical diagram of a binary counter constructed in accordance with the present invention.

When binary counters of the type shown in Figure 4 are employed as subcomponents of more complex devices, such as shifting registers, ring counters, memories and the like, a source of clear pulses 50 may also be coupled via the buffer 43 to the input of amplifier 40; and it will be understood that this source of clear input pulses 50, the function of which will be described subsequently, may be common to all stages utilizing the binary counter of the present invention.

Examining the operation of the circuit shown in Figure 4, it will be appreciated that when the bistable device including amplifier 40 is in a recirculating condition, pulses circulate via the delay means 41 and the recirculation gate 42. These circulating pulses, although appearing at an input terminal of output gate 45, do not appear at output terminal 49, inasmuch as the said output gate 45 is inhibited by pulses passing, via delay means 46, to the inhibition terminal of the said gate 45. If now an input pulse should be coupled from source 47, this input pulse will be coupled to the inhibition terminal 44 of recirculation gate 42, breaking the recirculation path of the bistable device and causing the said bistable device to revert to its second stable state characterized by a lack of pulses in the recirculation path. This lack of recirculating pulses in turn removes the inhibition from input gate 48 and from output gate 45. A second input pulse will then pass via the gate 48 and buffer 43 to the input of amplifier 40, causing the device to once more assume a recirculating condition. However, inasmuch as the inhibition of output gate 45 is initially delayed by delay means 46, the first pulse appearing at the output of amplifier 40 when the bistable assumes its recirculating condition, will pass via the said gate 45 and will appear at terminal 49. All subsequent output pulses will, of course, be inhibited so long as the bistable device remains in its recirculating condition. A third input pulse appearing from source 47 will once more merely cause the bistable device to assume a non-recirculating condition, without effecting an output pulse; and a fourth input pulse will again cause amplifier 40 to pass an initial output to terminal 49 via the output gate 45. Thus, the arrangement is such that a single output pulse appears at output 49 for each pair of input pulses supplied from source 47, whereby the arrangement shown in Figure 4 functions as a binary counter.

Figure 5:
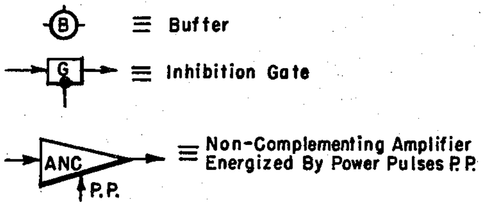
Figure 5 (A through H) are waveform diagrams illustrating the operation of the circuit of Figure 4.
Figure 5:
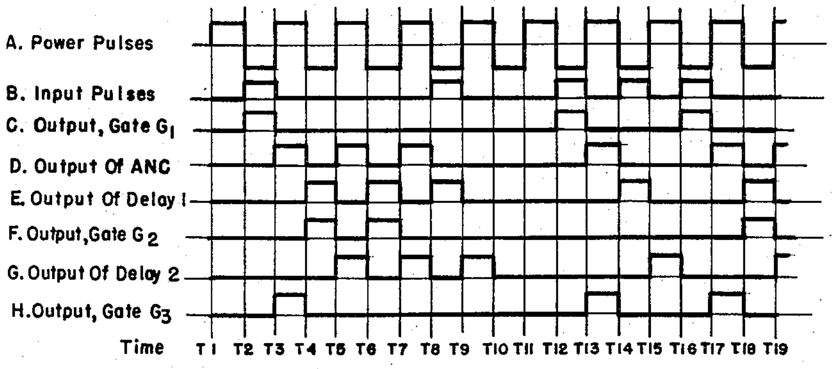

The foregoing operation will be seen more readily from an examination of the waveforms of Figure 5. Thus, assuming that amplifier 40 is a non-complementing magnetic amplifier of the type discussed in reference to Figure 2, this amplifier may be energized by a source of regularly occurring power pulses of the type shown in Figure 5A. If we should initially assume that the bistable device including amplifier 40 is in a non-recirculating condition, no inhibition will be applied to the input gate 48, and an input pulse appearing, for instance, during the time interval T2 to T3 (Figure 5B), will pass via the said input gate 48 (Figure 5C) and the buffer 43 to the input of amplifier 40. Amplifier 40 will therefore produce an output pulse during the time interval T3 to T4 (Figure 5D), which output pulse is coupled via output gate 45 to terminal 49 during the said time interval T3 to T4 (Figure 5H). The output pulse from amplifier 40, appearing during the time interval T3 to T4, will also be coupled to the delay means 41 and will cause a further pulse to pass from the said delay means 41 (Figure 5E), and the output of recirculation gate 42 (Figure 5F), to the input of non-complementing amplifier 40, during the time interval T4 to T5. Amplifier 40 will therefore produce a still further output pulse during the time interval T5 to T6 which further output pulse is coupled to an input of gate 45. However, by the arrangement of delay means 46 shown, the output pulse appearing from delay means 41 during the time interval T4 to T5 effects an output pulse from the said delay means 46 during the time interval T5 to T6 (Figure 5G), and this further output pulse is coupled to the inhibition terminal of output gate 45 preventing the output of amplifier 40, appearing during this time interval, from being passed to terminal 49. The operating condition thus effected is stable and will continue so long as no further input pulses are applied from source 47.

If, however, a further input pulse should appear, for instance during the time interval T8 to T9 (Figure 5B), this further input pulse will be coupled to inhibition terminal 44 of the recirculation gate 42 as well as to an input terminal of input gate 48. Inasmuch as a pulse appears at the output of delay means 41 during the time interval T8 to T9, the input gate 48 will be inhibited, and no pulse will pass via the said gate 48 and buffer 43 to the input of amplifier 40. Moreover, the input pulse applied to inhibition terminal 44 of recirculation gate 42 will cause the said gate 42 to be closed, thus breaking the recirculation path of the bistable device and preventing any pulse from passing therethrough during the said time interval T8 to T9. The bistable device employing amplifier 40 therefore reverts to a second stable state characterized by a lack of recirculating pulses. Amplifier 40 thus produces no output during the time interval T9 to T10, whereby no output pulse appears from delay means 41 during the time interval T10 to T11, or from the delay means 46 during the time interval T11 to T12, and inasmuch as no pulses are being produced at the output of amplifier 40, there will be no output pulses at output terminal 49.

A third input pulse applied during the time interval T12 to T13 will pass through the now initially open input gate 48 to the input of amplifier 40, causing the bistable device to once more assume a recirculating condition. Inasmuch as the inhibition of output gate 45 is initially delayed by the delay means 46, the first such output pulse appearing from amplifier 40, during the time interval T13 to T14 for instance, will be passed via the said output gate 45 to terminal 49. The above described cycle will be repeated for successive input pulses appearing from the source 47 and the operation of the device, for even further input pulses, is shown in Figure 5, for the time interval T14 to T19. Comparing Figures 5B and 5H, it will be seen that a single output pulse is effected at terminal 49 for each pair of input pulses from source 47; and the device therefore acts as a binary counter.

Counter devices of the type shown in Figure 4 may, of course, be utilized as a subcomponent in more complex logical devices. As will be seen from a comparison of Figures 5F and 5H, the passage of a pulse via recirculation gate 42 and buffer 43 to the input of amplifier 40, results in there being no output pulse at point 49. Thus, so long as the bistable device of the binary counter is in a recirculating condition, no outputs will appear from the said bistable device. A source of clear input pulses 50 may therefore be supplied and this source 50 may be coupled to each of the binary counter stages in the manner shown in Figure 4. When a pulse is in fact applied from the source 50 to each of the binary counter stages, each bistable device of such plural stages will be caused to assume a recirculating condition, thus clearing the entire chain of such devices to zero.

As will be appreciated from an examination of Figures 3B and 3C, a non-complementing amplifier, such as may be employed in the present invention, may be considered to act as a delay device, and such a non-complementing amplifier may therefore be replaced by other forms of delay means, passive in nature. Thus, the amplifier 40 of Figure 4 may comprise appropriate delay means, and by the same token one or both of the delay means 41 and 46 may be replaced by a non-complementing amplifier. The particular non-complementing magnetic amplifier shown in Figure 2, again, is merely illustrative, and other forms of such amplifiers may be employed without departing from the concepts of the present invention. Similarly, the particular bistable device utilizing the elements 40, 41 and 42, may be replaced by other forms of bistables known to those skilled in the art. Still further modifications will be readily apparent to those skilled in the art and it is emphasized, therefore, that the foregoing discussion is illustrative only and is not meant to be limitative of my invention.

Having thus described my invention, I claim:

1. A binary counter comprising a non-complementing magnetic amplifier having a core of magnetic material exhibiting a substantially rectangular hysteresis loop, means selectively coupling the output of said amplifier to the input thereof comprising first delay means and first gate means, second gate means coupled to the output of said amplifier, second delay means coupling the output of said first delay means to said second gate means to control said second gate means, an input gate having its output coupled to the input of said amplifier, means coupling the output of said first delay means to said input gate to control said input gate, a source of selective input pulses coupled to said input gate, and means coupling said source of input pulses to said first gate means to control said first gate means.

2. A binary counter comprising a magnetic amplifier bistable device having first and second predetermined stable states, output means responsive to said bistable device for producing a predetermined output in response to a change of said bistable device from said first to said second stable state, said output means being non-responsive to changes of said bistable device from said second to said first stable state, time delay means coupled from said bistable device to said output means to inhibit said output means from producing additional outputs after said predetermined output, whereby only said predetermined output is produced in response to a change of said bistable device from said first to said second state, said magnetic amplifier bistable device including pulse responsive means for changing the state of said bistable device alternately from one to the other of said stable states, and a source of pulses to be counted coupled to said pulse responsive means.

3. A binary counter comprising delay means having an input and an output, recirculation means including a first gate for interconnecting the output and input of said delay means, whereby said delay means and recirculation means comprise a bistable device having a first stable state represented by signals recirculating between the output and input of said delay means, and having a second stable state represented by absence of such recirculating signals, a second gate having its output connected to an input of said bistable device, a source of control signals coupled both to the input of said second gate and to a control terminal of said first gate whereby signals from said control source pass via said second gate to the said input of said bistable device in dependence upon the conductivity state of said second gate and said control signals simultaneously control the conductivity of said first gate in said recirculation means of said bistable device, means coupling signals in said recirculation means to a control terminal of said second gate whereby the conductivity of said second gate varies with variations in the state of stability of said bistable device, and an output gate coupled to the output of said delay means and to said recirculation means to control the delivery of output signals from the counter.

4. A binary counter comprising a bistable device for producing signals in the form of pulses when in one stable state and signals in the form of absence of pulses in the other state, said device including magnetic pulse amplifier means having an input and an output, recirculation means connected to said amplifier output, input means for supplying pulses, and gate means connected to said input means and recirculation means for driving said device alternately to said stable states in response to successive input pulses, said input and recirculation gate means including means responsive to different combinations of signals from said recirculation means and said input means for supplying different signals to said amplifier input, output gate means connected to said amplifier output for producing an initial output pulse in response to a pulse at said amplifier output when said device is driven to said one stable state, and delay means connected from said amplifier output to said output gate means to prevent production of additional output pulses after said initial pulse following said device being driven to said one stable state.

5. A binary counter as recited in claim 4, wherein said input and recirculation gate means includes means responsive to a pulse from either said input means or said recirculation means but not from both for supplying a pulse to said amplifier input.

References Cited in the file of this patent

UNITED STATES PATENTS

| | | |
|---|---|---|
| 2,709,798 | Steagall | May 31, 1955 |
| 2,710,952 | Steagall | June 14, 1955 |
| 2,713,675 | Schmitt | July 19, 1955 |